Figure 21:
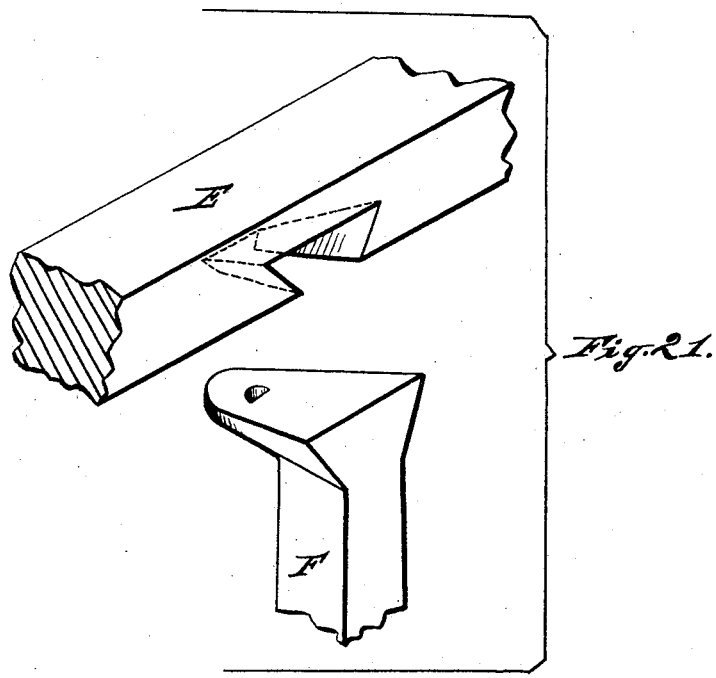

(No Model.) 4 Sheets—Sheet 1.
C. H. LOGAN.
SECONDARY BATTERY.
No. 417,055. Patented Dec. 10, 1889.
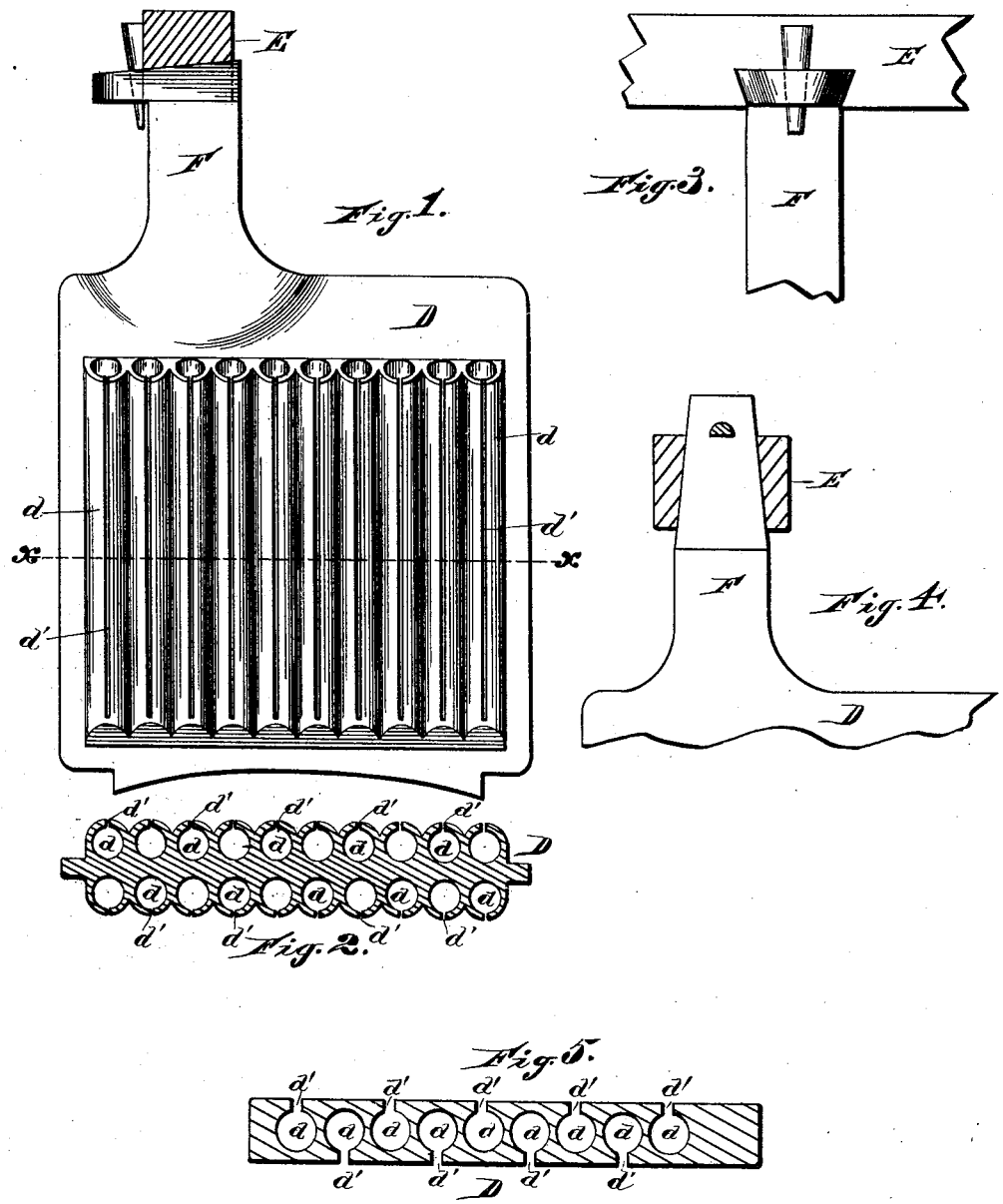
WITNESSES
M. M. Wiles
G. R. Jenkins
INVENTOR
Charles Henry Logan
By John E. Wiles,
Attorney.

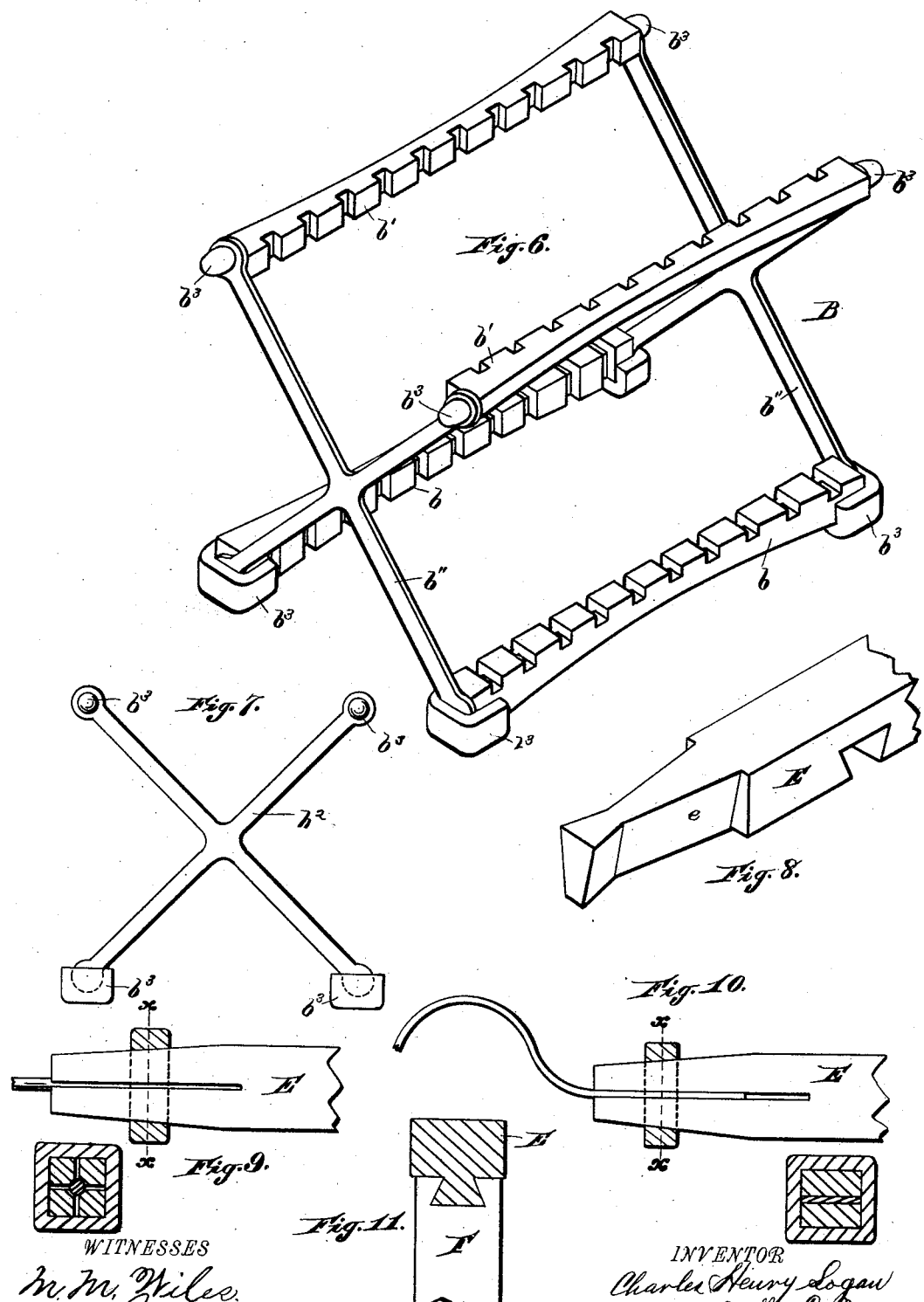

(No Model.) 4 Sheets—Sheet 3.
C. H. LOGAN.
SECONDARY BATTERY.
No. 417,055. Patented Dec. 10, 1889.
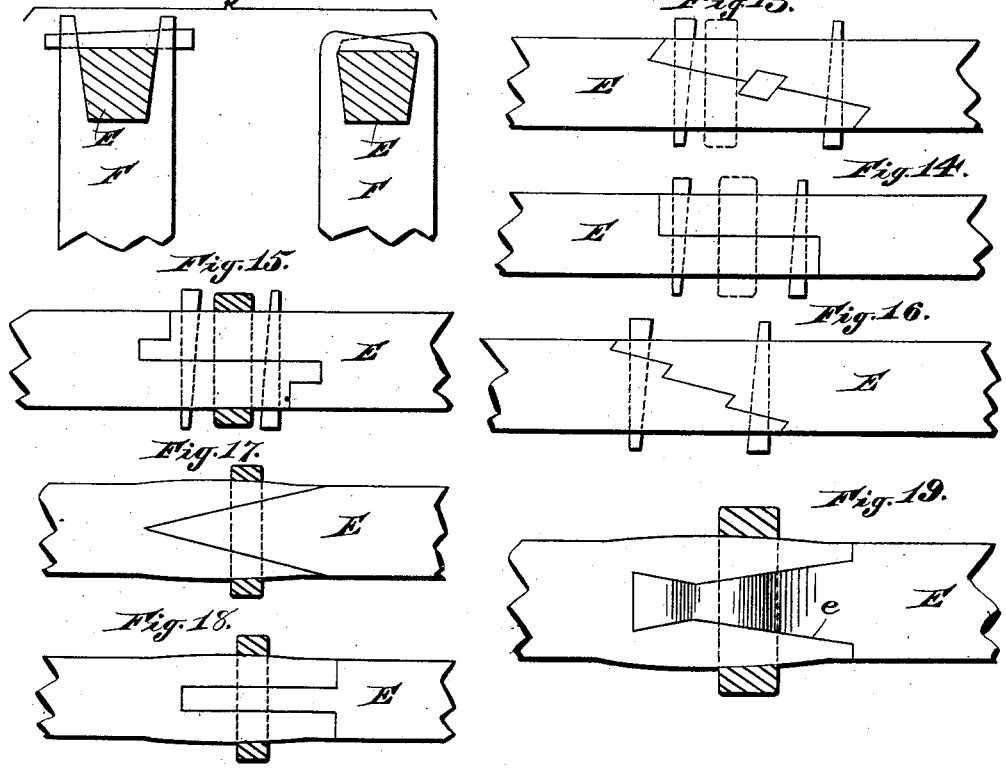
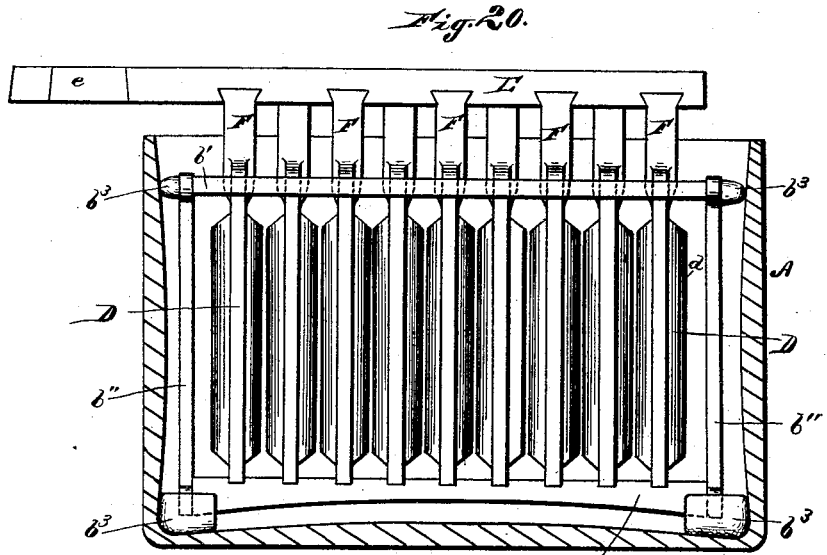
WITNESSES
M. M. Wiles.
G. R. Jenkins.
INVENTOR
Charles Henry Logan,
By John E. Wiles.
Attorney.

(No Model.)  4 Sheets—Sheet 4.
C. H. LOGAN.
SECONDARY BATTERY.

No. 417,055. Patented Dec. 10, 1889.

WITNESSES
John T. Liggett.
V. A. Thayer.

INVENTOR
Charles Henry Logan.
By John E. Wiles,
Attorney.

UNITED STATES PATENT OFFICE.

CHARLES HENRY LOGAN, OF TORONTO, ONTARIO, CANADA.

SECONDARY BATTERY.

SPECIFICATION forming part of Letters Patent No. 417,055, dated December 10, 1889.

Application filed May 1, 1889. Serial No. 309,160. (No model.)

*To all whom it may concern:*

Be it known that I, CHARLES HENRY LOGAN, a subject of the Queen of Great Britain, residing at Toronto, county of York, Province of Ontario, Canada, have invented a certain new and useful Improvement in Secondary Batteries; and I declare the following to be a full, clear, and exact description of the invention, such as will enable others skilled in the art to which it pertains to make and use the same, reference being had to the accompanying drawings, which form a part of this specification.

My invention relates to certain new and useful improvements in secondary batteries or magazines of electricity composed of plates of lead or other suitable material which have attached thereto or packed therein or thereon spongy precipitated or reduced metal or metallic matter, such plates being immersed in cells, vessels, or receptacles containing a suitable electrolytic liquid.

My invention has for its object the providing of the maximum of active surface in the minimum space, so as to obtain a battery of great strength, and contained in or occupying a small compass as compared with its efficiency.

The various features of my invention will be set forth in the following specification and claims, reference being made to the accompanying drawings, in which—

Figure 1 is a side elevation of a battery-plate having tubular recesses slotted to permit the circulation of the electrolytic liquid through and around the spongy metallic substance within the recesses. Fig. 2 is a sectional view of the same on line $x\,x$ of Fig. 1. Fig. 3 is a view of the upper part of a plate, showing the binding-post and a three-way dovetail connection with the conductor-bar. Fig. 4 is a view of another form of connecting the plates to the conducting-bar by a taper tenon and pin. Fig. 5 is a view of a modified form of my improved plate. Fig. 6 is a perspective view of my improved rack for carrying the plates independently of each other in the cell. Fig. 7 is an end view of the said rack, showing the method of cushioning the same within the cell. Fig. 8 is a perspective view of the connecting-bar, showing the manner of connecting to the binding-posts of the several plates and the method of connecting the several cells together. Fig. 9 is a side and sectional view of the wire end connection and ring. Fig. 10 is a similar view of another form of connection. Fig. 11 is a view of another modification in which the male part of the dovetail connection is located upon the under side of the connecting-bar and the female part is formed on the top of the binding-post of the plate. Fig. 12 is a view of another form of connection of the connecting bar and the plate, in which a slightly-tapered slash-mortise is cut in the top of the binding-post to receive the correspondingly-tapered sides of the conducting-bar and the parts secured together by means of a draw-pin or by bending the ends of the metal. Fig. 13 is a view of a modified form of connection between two cells by means of a substantially-parallel joint in the conducting-bar. Fig. 14 is a view of another modification. Fig. 15 represents another modification of said connection. Figs. 16, 17, and 18 represent still other forms of connections between the conducting-bars. Fig. 19 is an enlarged view of the form of connection shown in Fig. 8. Fig. 20 is a view showing the plates in the rack and the rack in the cell ready for the fluid electrolyte. Fig. 21 is a perspective view of the detached parts which form the three-way dovetail connection or draw-joint between the conducting-bar and the binding-posts.

A represents any ordinary battery cell; B, the rack for supporting the battery-plates in position within the cell, and composed of the bottom rails $b$, top rails $b'$, and end frames $b''$, and being provided with suitable cushions $b^3$, of rubber or other suitable material, at its corners to afford a yielding engagement with the glass cell.

D represents the battery-plates, of lead or other suitable material. These plates have tubular receptacles $d$ for the active material, and these receptacles are slotted, as shown at $d'$, to permit the admission and circulation of the electrolytic liquid around the active material or material to be made active in the receptacles *d*. Another advantage gained by this slotting of the receptacles is, that the lead plate is permitted to expand and contract independently of the active material in the receptacles *d*.

E represents the conducting-bar, connected to the several plates by means of the binding-posts F by any suitable dovetail or other similar connection. I prefer to employ the form of connection shown in Fig. 3; but any of the various modifications shown in Figs. 4, 11, and 12 may be used, if desired, to form the connections between the conducting-bars and the battery-plates. The connections between the several cells may be made in any of the forms shown in Figs. 8, 9, 10, 13, 14, 15, 16, 17, and 18; but I prefer to connect the cells as shown in Fig. 8 at *e*.

By the formation of the tubular receptacles or recesses upon the sides of the battery plates or electrodes in which the active material or material to be made active is placed, I obtain a greater amount of surface than can be obtained by any of the modes of forming the receptacles by indenting, serrating, corrugating, or grooving the surfaces of the plates, as resorted to in the construction of all the ordinary forms of secondary-battery plates, and at the same time the active material or material to be made active is confined in the receptacles in such a manner as to allow for the independent expansion and contraction of said active material without the liability of the scaling off of the said active material or material to be made active and the disintegration thereof due to the material being forced out of the receptacles by its own expansion, as is the case in all ordinary forms of devices of this nature.

A great loss of energy has been heretofore and is now suffered by reason of imperfect contact afforded by the connections in use by the manufacturers of secondary batteries, the resistance being largely increased thereby, thus largely reducing the efficiency of the battery.

By my improved form of connection, as shown in the drawings, any one or number of plates may be removed and other plates substituted without injury to the conducting-bar or the plates, the contact being formed without the use of screws and without resorting to burning or soldering the plates to the conducting-bar. By my improved method of connecting the plates to the conducting-bars and the several cells together the largest possible amount of the surfaces of the conducting-bars and the binding-posts of the plates is brought together, thus producing the best possible contact with the least possible resistance to the passage of the electric current in charging and discharging the battery. It will be also observed that by my improved method of connecting the plates to the conducting-bars I secure great economy in the manufacture and setting up of the battery by the dispensing with the labor of burning or soldering the parts together. By the employment of the large-sized binding-posts and conducting-bars the contact between the parts is rendered more perfect and the resistance is reduced to a minimum. Also, my improved battery-plate is much more easily and cheaply manufactured than any of the various forms of plates in ordinary use, as the said plates may be cast with the tubular recesses therein or thereon, and with the slots in the said recesses, all at one operation, thereby dispensing with much labor in the formation of the said plates.

Another advantage gained by my improvement is, that by the slotting of the plates, as shown, the plate is permitted to expand and contract without the liability of warping, which is a common fault with all the forms of battery-plates as ordinarily constructed. These same advantages are all possessed by the plate constructed as shown in Fig. 5 of the drawings.

By reference to the drawings it will be readily seen that my improved method of securing the plates within a rack within the cell, said rack being cushioned in such a manner as to place the strain of carrying the plates upon a series of elastic cushions having their bearings at the strongest points of the shell, and the novel construction of the rack upon the arch and brace principle, gives great lightness to the rack, together with great strength and elasticity. The rack being so constructed carries each plate in its place independently of the other plates, and yet distributes the load in such a manner as to support all the plates in position without allowing any undue strain to be placed upon any one or more of the plates, and at the same time allows for their independent expansion and contraction without straining the frame.

I would have it understood that I do not limit myself to the exact forms of construction shown and described, as the various features of my invention may be severally modified without departing from my original invention.

Having thus described my invention, what I claim as new, and desire to secure by Letters Patent, is—

1. In a secondary battery, battery-plates having receptacles for the active material, said receptacles being placed in substantially vertical positions and slotted or perforated to permit the admission and circulation of the electrolyte through and around the said active material or material to be made active, whereby the material contained in said receptacles is prevented from being washed or jarred out of said receptacles, and at the same time the said material and also the material of which the plate is formed are both permitted to expand and contract independently of each other and without disruption of their contact, substantially as described.

2. In a secondary battery, plates, of lead or other suitable material, provided with vertical tubular receptacles or recesses for containing the active material or material to be made active, said tubular recesses being provided with slots along their faces, substantially as and for the purpose described.

3. In a secondary battery, plates, of lead or other suitable material, provided with suitable binding-posts, and in connection therewith a suitable conducting-bar and means for forming connections between the said plates and the conducting-bar by means of three-way dovetail or draw joints so constructed as to draw the parts firmly together as they are interlocked, substantially as described.

4. In a secondary battery, a conducting-bar having arranged upon its under side three-way dovetail recesses adapted to receive corresponding male portions of dovetail joints upon the binding-posts of the battery-plates, substantially as described.

5. In a secondary battery, a conducting-bar having at one or both ends dovetail or other draw-joint connections or splices formed in lines substantially parallel with said conducting-bar, by means of which the sections of said conducting-bar to be united together are made to interlock, and in connection therewith suitable means for binding the parts together at the joints to afford a perfect contact, substantially as described.

6. In a secondary battery, a conducting-bar having upon its under side dovetail or three-way connections with the binding-post of the several plates and at one or both of its ends combination V-shaped and dovetail splices formed substantially parallel with said conducting-bar, by means of which the parts to be united are made to interlock, said splices being surrounded by a ring or other suitable binding device to give perfect contact between all parts of the joint to be united, substantially as and for the purposes described.

7. In a secondary battery, a conducting-bar having suitable dovetail connections with the battery-plates and having at one or both of its ends one or more longitudinal slots to receive the wire or other conductor, the sides of the conducting-bar being tapered more or less at this point, and in connection therewith a suitable ring or collar adapted to move longitudinally upon the conducting-bar to bind the divided end of the conducting-bar upon the wire or other conductor, substantially as described.

8. In a secondary battery, a rack or frame for holding the battery-plates in position, said rack or frame being provided with suitable cushions for holding the rack or frame in an elastic but firm manner within the cell, substantially as described.

9. In a secondary battery, a rack or frame to hold the plates, said rack or frame being constructed of arched pieces held together in any suitable manner, and so constructed and arranged that all the weight of the plates and material shall be sustained by the strongest portion of the cell, said rack or frame being also cushioned to allow full freedom for the cell to expand while in use, substantially as and for the purpose described.

10. In a secondary battery, a rack or frame to hold the battery-plates, said rack being supported upon the bottom of the cell by suitable elastic cushions and having cushions or balls of rubber attached to the corners of the rack and adapted to engage the sides or ends of the cell, substantially as described.

11. The combination, in a secondary battery, of plates, of lead or other suitable material, having tubular recesses for the active material or material to be made active, suitable conducting-bars connected by dovetail or other similar connections to the said plates and having suitable connections, as herein described, for the accompanying cells, and a rack or frame to support the plates in position, said rack or frame having a cushioned engagement with the cell, substantially as and for the purposes described.

In testimony whereof I sign this specification in the presence of two witnesses.

CHARLES HENRY LOGAN.

Witnesses:
JOHN E. WILES,
V. A. THAYER.